March 26, 1968  J. KURLOVICH  3,374,569

FISHING LURE

Filed June 7, 1967

INVENTOR.
JOHN KURLOVICH
BY
WILSON, SETTLE & BATCHELDER.
ATT'YS.

United States Patent Office 3,374,569
Patented Mar. 26, 1968

3,374,569
FISHING LURE
John Kurlovich, 32225 MacKenzie,
Garden City, Mich. 48135
Continuation-in-part of application Ser. No. 411,205,
Nov. 16, 1964. This application June 7, 1967, Ser.
No. 644,162
5 Claims. (Cl. 43—42.36)

ABSTRACT OF THE DISCLOSURE

The disclosure includes a fishing lure with a body portion and a thin tail portion extending longitudinally from the top of the body portion which provides a surface on the under side of the tail portion for the attachment of a spinner blade adjacent the body portion with the spinner blade extending transversely of the tail portion on each side thereof and mountings for fish hooks below, above and on said tail portion.

---

This application is a continuation-in-part of my copending application Ser. No. 411,205, filed Nov. 16, 1964, for Fishing Lure and now Patent No. 3,344,548.

Summary of the invention

In accordance with my invention I provide a new and improved fishing lure wherein an elongated member is provided with a body portion and a relatively thin tail portion extending longitudinally from the upper part of the body portion to provide for the ready attachment of a spinner blade on the under side of the tail portion adjacent the body portion. The space below the tail portion and adjacent the body portion is a cutaway space when the member is made of wood or formed to provide the space when the member is made of plastic. The space below the tail portion also provides space for the attachment of a fish hook on the underside of the tail portion by a wire which extends upwardly through the tail portion to provide for the attachment of a fish hook above the tail portion. The wire may also be extended on one end through the body portion to provide for the attachment of a fishing line at the front of the body portion and extends rearwardly to provide a lock in the tail portion. The lure is inexpensive to produce by reason of the body and tail portions arrangement which permits the ready assembly of the spinner and hook attachments with such attachments holding the fish hooks in a new manner for improved spinning arrangement.

It is therefore an object of my invention to provide an inexpensive and effective fishing lure which may be readily assembled and due to its novel construction produces an improved spinning arrangement.

Other objects of this invention will appear in the following description and appended claims reference being had to the accompanying drawings forming a part of this specification where like reference characters designate corresponding parts in the several views.

Figure 1:
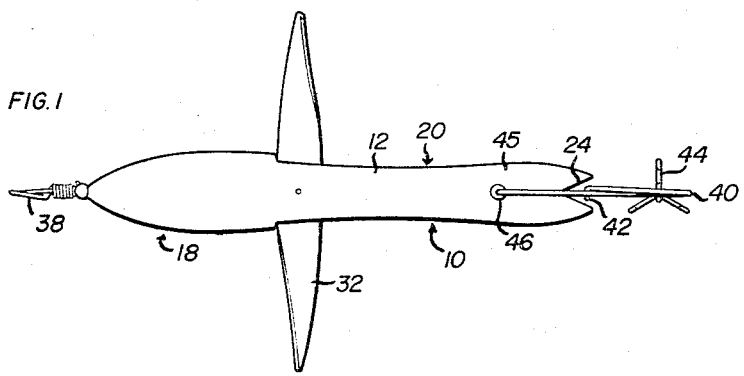
FIGURE 1 is a plan view in elevation of a fishing lure embodying features of my invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the numeral 10 designates in general a fishing lure. The lure includes an elongated member 12 which is made of wood having a cutaway portion as at 16 to provide a body portion 18 at the front of the member 12 and a relatively thin tail portion 20 extending longitudinally from the top of the body portion 18 and includes a notch 24 in the tip of the tail portion. The member may, if desired, be formed of plastic to provide a space below the tail portion 20.

The tail portion 20 provides a surface on its under side 28 for the ready attachment of a spinner blade 32 adjacent the body portion 18 as at 16 with the spinner blade extending transversely across said tail portion on opposite sides thereof. The lure 10 includes a one piece wire member 36 which extends through the body portion 18 to arrange for the attachment of a leader or rotatable connection of a fishing line as at 38. The wire member 36 extends beneath the tail portion to a distance near the end of the tail portion where it extends vertically through the tail portion to provide a looped end 40 which has a catch portion 42 extending around the looped end 40 to provide a ready release for the insertion of a fish hook 44 in the looped end 40 and the release thereof. The looped end 40 extends downward from the upper side 45 of the tail portion into the groove 24 so as to lock the looped end 40 against lateral movement. Two ornamental beads 46 are placed on the wire 36 with one being immediately above the upper side 45 of the tail portion 20 and the other immediately below the under side 28 of the tail portion 20 to space the wire 36 from the upper and lower sides of the tail portion. A fish hook 50 is mounted on the wire 36 for movement longitudinally between the body portion 18 and the bead 46 on the under side 28 of the tail portion 20. Instead of a one piece wire 36 two wires may be used with one for the body portion and the other for supporting the fish hooks as shown supported. In either event whether one or two wires are used the ends of the wires on the upper and lower sides of the tail portion provide means for supporting fishing hooks.

Figure 4:
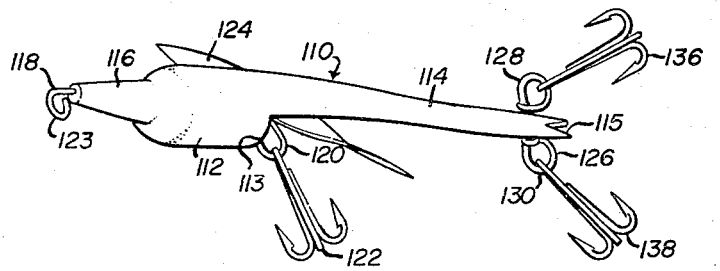
FIGURE 4 is a perspective view of another form of the invention.
Figure 5:
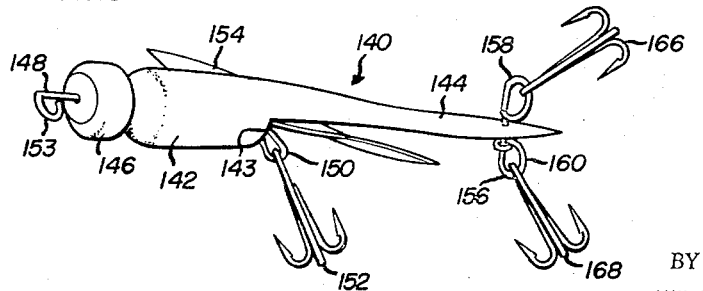
FIGURE 5 is a perspective view similar to FIGURE 4 and shows a slightly different form.

The lures 110 and 140 illustrated in FIGURES 4 and 5, respectively, are substantially the same, except for obvious differences in the contouring of their head portions 116 and 146 which are similar in contour to a previous embodiment. The lures 110 and 140 are each provided with a relatively thin single tail 114 or 144, respectively, extending longitudinally from the top of a cylindrical body member 112 or 142. An end shoulder 113 or 143 is thus formed on the intermediate body portion of the members 112 and 142, respectively. A single sheet metal propeller or fin forming member 124 or 154 is mounted on the under side of each tail portion 114 or 144, respectively, adjacent the body portion and adapted to rotate its respective lure during longitudinal movement through the water.

In the lure illustrated in FIGURE 4, a wire 118 extends through the conically tapered head portion 116 and the intermediate portion of the body member 112. The rearwardly projecting end of the wire 118 is bent to form a loop 120 engageable with the body from shoulder 113 and adapted to removably mount a fishing hook 122. The projecting forward end of the wire 118 forms a loop 123 attachable to a fishing line through a rotatable connection.

A second hook mounting wire member 126 is pivotally mounted adjacent the rear end of tail portion 114 and is bent to form loops 128 and 130 engageable with the upper and lower sides of the tail portion and adapted to mount fishing hooks 136 and 138. The wire member 126 extends vertically through the tail portion 114. The end portions of these loops are each provided with a reverse bend loosely engaging the intermediate portion of the wire adjacent the tail portion. These wire end portions are deflectable relative to the tail portion and to the tail supported wire portion and thus permit the fish hooks 136 and 138 to be easily and safely mounted on the wire formed loops 128 and 130, respectively.

Returning briefly to FIGURE 5, a wire member 148 extends through the body member 142 and is bent to form a loop 150 adapted to removably mount a fish hook 152 and an end loop 153 attachable to a fishing line through a rotatable connection. A second wire member 156 similar to the wire 126 of the previous embodiment is pivotally mounted in the tail portion 144 and bent to form deflectable loops 158 and 160 adapted to removably mount fishing hooks 166 and 168 and extends vertically through the tail portion.

Figure 2:
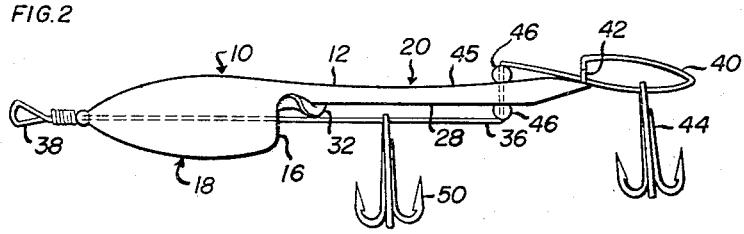
FIGURE 2 is a side view in elevation of the fishing lure shown in FIGURE 1.
Figure 3:
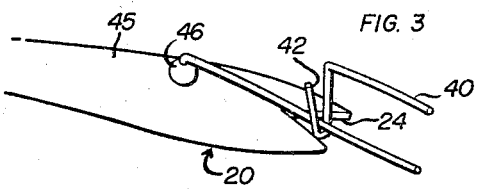
FIGURE 3 is a fragmentary view in perspective showing a locking arrangement between a wire and a tail portion of the lure.

The lures shown in FIGURES 4 and 5 have the same under space below the tail portion as shown in connection with the lure shown in FIGURES 1 and 2.

From the foregoing description, it will be seen that the several illustrative embodiments are fully capable of providing the several stated objects, advantages and features of the invention. It will be further apparent that various changes might be made therein without departing from the spirit and scope of the invention as defined in the following claims.

I claim:
1. A fishing lure wherein the improvement comprises an elongated member having a body portion and a relatively thin tail portion extending longitudinally from the upper part of aid body portion, a spinner blade member attached to the under side of said tail portion adjacent said body portion and extending on opposite sides of said tail portion, means on the underside of said tail portion for supporting a depending fish hook and means extending on the upper side of said tail portion for supporting a second fish hook above said first named hook.

2. A fishing lure as defined in claim 1 wherein the body portion is provided on the front end with means for attachment to a fishing line and the means on the under side and upper side is a wire extending vertically through said tail portion below and above said relatively thin tail portion for the attachment of the fish hooks.

3. A fishing lure as defined in claim 1 wherein the means on the upper side of said relatively thin tail portion for supporting a fish hook constitutes a looped wire having a portion extending into a slot on the end of said tail portion and providing a locked position.

4. A fishing lure as defined in claim 1 wherein the body portion is provided on the front end with means for attachment of a fishing line and the means on the under side and upper side of the tail portion for supporting the fish hooks constitute a single integral wire.

5. A fishing line as defined in claim 1 wherein the body portion is provided with a longitudinally extending wire for attachment with a fishing line on the front end thereof and a loop on the other end adjacent the body portion and below the relatively thin tail portion for supporting a depending fish hook and the means on the under side and upper side of said tail portion for supporting the fish hooks constituting a wire member extending vertically through the relatively thin tail portion and having provisions below and above said tail portion for releasably attaching the fish hooks.

References Cited
UNITED STATES PATENTS

| 1,490,161 | 4/1924 | Dickman | 43—42.36 |
| 1,522,450 | 1/1925 | Hayes | 43—42.36 |
| 1,727,936 | 9/1929 | Pflueger | 43—42.36 X |
| 2,159,230 | 5/1939 | Sage | 43—42.16 |
| 2,306,020 | 12/1942 | Hughes et al. | 43—42.21 |
| 2,333,590 | 11/1943 | Schueller | 43—42.28 X |
| 2,896,357 | 7/1959 | Kurtz | 43—42.36 |

FOREIGN PATENTS

| 481,156 | 2/1952 | Canada. |

SAMUEL KOREN, *Primary Examiner.*

W. H. CAMP, *Examiner.*

UNITED STATES PATENT OFFICE
CERTIFICATE OF CORRECTION

Patent No. 3,374,569                 March 26, 1968

John Kurlovich

It is certified that error appears in the above identified patent and that said Letters Patent are hereby corrected as shown below:

Column 4, line 16, for "line" read -- lure --.

Signed and sealed this 15th day of July 1969.

(SEAL)
Attest:

Edward M. Fletcher, Jr.            WILLIAM E. SCHUYLER, JR.
Attesting Officer                   Commissioner of Patents